(12) United States Patent  (10) Patent No.: US 6,858,238 B2
Lee et al.  (45) Date of Patent: Feb. 22, 2005

(54) CHEWING GUM PRODUCTS INCLUDING PROLAMINE BLENDS

(75) Inventors: Willy Weisheng Lee, Bridgewater, NJ (US); Jingping Liu, Highland Park, NJ (US)

(73) Assignee: Wm. Wrigley Jr. Company, Chicago, IL (US)

( * ) Notice: Subject to any disclaimer, the term of this patent is extended or adjusted under 35 U.S.C. 154(b) by 0 days.

(21) Appl. No.: 10/180,699

(22) Filed: Jun. 26, 2002

(65) Prior Publication Data

US 2004/0001903 A1 Jan. 1, 2004

(51) Int. Cl.$^7$ ................................................. A23G 3/30
(52) U.S. Cl. .................................................. 426/6; 426/3
(58) Field of Search ............................... 426/3, 5, 6, 660

(56) References Cited

U.S. PATENT DOCUMENTS

| | | |
|---|---|---|
| 2,154,482 A | 4/1939 | Weber |
| 2,489,147 A | 11/1949 | Lougovoy |
| 3,116,206 A | 12/1963 | Brynko et al. |
| 4,186,214 A | 1/1980 | Crouse, III et al. |
| 4,433,076 A | 2/1984 | Bauer et al. |
| 4,474,749 A | 10/1984 | Kruppa |
| 4,753,790 A | 6/1988 | Silva et al. |
| 4,847,010 A | 7/1989 | Maeda et al. |
| 4,863,745 A | 9/1989 | Zibell |
| 4,931,295 A | 6/1990 | Courtright et al. |
| 5,112,625 A | 5/1992 | Zibell et al. |
| 5,139,794 A | 8/1992 | Patel et al. |
| 5,324,351 A | 6/1994 | Oshlack et al. |
| 5,342,923 A | 8/1994 | Takahashi et al. |
| 5,367,055 A | 11/1994 | Takahashi et al. |
| 5,409,715 A | 4/1995 | Meyers |
| 5,433,960 A | 7/1995 | Meyers |
| 5,482,722 A | 1/1996 | Cook |
| 5,589,468 A | 12/1996 | Lin et al. |
| 5,882,702 A | 3/1999 | Abdel-Malik et al. |
| 5,958,480 A | 9/1999 | Eggink et al. |
| 6,013,287 A | 1/2000 | Bunczek et al. |
| 6,020,008 A | 2/2000 | Li |
| 6,194,008 B1 | 2/2001 | Li et al. |

FOREIGN PATENT DOCUMENTS

| | | |
|---|---|---|
| DE | 30 43 914 A1 | 6/1981 |
| JP | 7-163300 | 6/1995 |
| WO | WO 89/09594 | 12/1989 |
| WO | WO 90/06061 | 6/1990 |
| WO | WO 90/12512 | 11/1990 |

*Primary Examiner*—Arthur L. Corbin
(74) *Attorney, Agent, or Firm*—Bell, Boyd & Lloyd LLC

(57) ABSTRACT

Prolamine blends including at least one polyester and methods of preparing same are provided. The blends can be used for making chewing gum bases, especially biodegradable chewing gum bases. The blends are also useful for making other edible products as well as eco-friendly packaging films, coatings, adhesives, and encapsulation vehicles for medicament delivery and the like.

17 Claims, 1 Drawing Sheet

CHEWING GUM PRODUCTS INCLUDING PROLAMINE BLENDS

BACKGROUND OF THE INVENTION

The present invention relates to prolamine blends. More specifically, the present invention relates to edible and biodegradable prolamine compositions.

For certain applications, prolamines have been used in consumer products. For example, zein is a water-insoluble prolamine (protein) obtained from corn. Zein is edible and readily biodegradable. Accordingly, zein is a very attractive material for use in food applications.

Additionally, zein has been used in industrial applications. In this regard, zein has been used in creating materials such as packaging films, coatings, and adhesives. However, zein is a very brittle plastic material. Typically, when sufficiently heated, zein will thermally decompose rather than melt. This property is due to strong hydrogen bonding. Moreover, usually zein is used in the form of either a fine powder or an alcohol/water solution. This creates processing difficulties that limit the applications and uses of zein.

In food products, due to its desirable characteristics, there have been attempts at using zein in products such as chewing gum formulations. In this regard, zein has nutritional and biodegradability properties that are desirable in such products. Further, in an application such as chewing gum, the fact that zein becomes brittle after it loses moisture is an advantageous property. This feature eases the removal of zein-containing gum cuds from substrates.

A number of patents discuss the use of zein in chewing gum. See, U.S. Pat. Nos. 2,154,482; 2,489,147; 5,482,722; 5,139,794; 3,116,206; 5,112,625; 4,863,745; 4,931,295; 5,367,055; 5,482,722; 4,753,790; 4,474,749; 5,409,715; 5,433,960; 5,882,702; and non-U.S. patents and published applications: JP95-163300; German Patent DE3043914A1; PCT WO90/12512; PCT WO90/06061; and PCT WO89/09594. Other patents discussing zein include U.S. Pat. Nos. 5,325,351; 5,367,055; 5,342,923; 5,324,351; and 6,020,008. See also: Shukla, "Trends in Zein Research and Utilization," Cereal Foods World, 37(2), 225 (1992); and Beck, "Physico-chemical characterization of zein as a film coating polymer: A direct comparison with ethyl cellulose," International J. Pharmaceutics, Vol. 141, 137 (1996); and Sanchez, "Effects of different plasticizers on the mechanical and surface properties of wheat gliadin films," J. Agric. Food Chem., Vol. 46, 4539 (1998).

However, due to processing problems and other issues associated with current methods of processing zein, the use of zein in chewing gum, as well as other food-grade and eco-friendly products as well as industrial applications, has been problematic. There is therefore a need for improved processing methods for zein and other prolamines.

SUMMARY OF THE INVENTION

The present invention provides prolamine blends, processes for making same, and improved biodegradable and edible products such as foodstuffs, confections, chewing gums, package films, coatings, adhesives, and encapsulants for drugs, flavors, and sweeteners.

To this end, in an embodiment, the present invention provides a method of softening a prolamine comprising the step of combining at least one prolamine and at least one polyester.

In another embodiment, the invention provides a method whereby a physical property of a prolamine can be modified by combining at least one prolamine and at least one polyester. The physical property modified can include chemical structure, consistency, tack, texture and melting point.

In an embodiment, the present invention provides for edible and biodegradable products comprising a prolamine blend of at least one prolamine and at least one polyester.

In an embodiment, the blends are thermally processable.

In an embodiment, the prolamines can include zein, corn gluten meal, wheat gluten, gliadin, glutenin and combinations thereof.

In an embodiment, polyesters can be used singly or in combination. Such polyesters include, but are not limited to, poly(lactic acid), polylactide, poly(glycolic acid), polyglycolide, poly(citric acid), and polycaprolactone.

In an embodiment, the polyesters can also include copolymers containing any combination of the following monomers: lactic acid, lactide, glycolic acid, glycolide, citric acid, adipic acid, caprolactone, ethylene oxide, ethylene glycol, propylene oxide, propylene glycol and combinations thereof. In this regard, copolymers can be random-, alternating-, blocking-, or grafting-copolymers.

In an embodiment, the polyesters can additionally include reaction products of the reaction between rosin and at least one alcohol. Such alcohols can include, for example, methanol, ethanol, propanol, and butanol and combinations thereof.

In an embodiment, the polyesters can additionally include reaction products of the reaction between rosin and at least one glycol. Such glycols can include, for example, glycerin, propylene glycol, ethylene glycol, poly(ethylene glycol), poly(propylene glycol), poly(ethylene glycol-co-propylene glycol) and combinations thereof.

In an embodiment, the polyesters can additionally include reaction products of the reaction between at least one dimer acid and at least one glycol. Such glycols can include, for example, glycerin, propylene glycol, ethylene glycol, poly (ethylene glycol), poly(propylene glycol), poly(ethylene glycol-co-propylene glycol), and combinations thereof. Such dimer acids can include, for example, adipic acid and citric acid.

In an embodiment, the polyesters can additionally include polyhydroxyalkanoate.

In an embodiment, the prolamine can comprise about 1 to about 99.5% of the product. Preferably, prolamine comprises about 20% to about 95% of the blend.

In a further embodiment, the polyester can comprise about 0.5 to about 99% of the blend. Preferably the polyester can comprise about 5% to about 80% of the blend.

In an embodiment, a method of making such prolamine blends is provided whereby prolamine is combined with polyester.

In an embodiment, prolamine and polyester can be combined using a batch mixer or continuous extruder.

In an embodiment, prolamine can be combined directly with polyester.

In an embodiment, prolamine can first be mixed with an alcohol/water mixture prior to being combined with polyester.

In an embodiment, edible products are provided that contain the prolamine blends disclosed herein.

In a further embodiment, a method is provided whereby edible products are produced by dissolving at least one prolamine in an alcohol/water mixture and adding at least one polyester to the mixture.

In an embodiment, chewing gum bases containing prolamine blends are disclosed whereby the gum bases include a blend of prolamine and polyester.

In an embodiment, methods for manufacturing such chewing gum bases are provided whereby prolamine is combined with polyester.

In an embodiment, chewing gums containing prolamine blends and a flavor are provided.

In a further embodiment, biodegradable products containing prolamine blends are disclosed. In this regard, the biodegradable products can include, for example, confections, chewing gums, adhesives, coatings, packaging films, and encapsulants for medicaments and flavors and the like.

In a further embodiment, a method is provided whereby a biodegradable product is produced by dissolving at least one prolamine in an alcohol/water mixture and adding at least one polyester to the mixture.

An advantage of the present invention is to provide a more usable form of prolamine such as zein and wheat gluten with properties ranging from pasty adhesives, to rubbery chewing gum bases, to tough packaging films.

Another advantage of the present invention is to provide an improved method for incorporating a prolamine, such as zein and wheat gluten, in an edible and biodegradable product.

Moreover an advantage of the present invention is to provide an improved edible product that includes zein and wheat gluten and other prolamines.

It is another advantage to provide improved chewing gum bases and chewing gums that are biodegradable and potentially digestible by mammals, and preferably humans.

Further, an advantage of the present invention is to provide an improved process for making mixtures including prolamine.

Yet another advantage of the present invention is to provide prolamine containing mixtures that can be altered over a wide range of properties, from a tacky state to a brittle state, through the addition of a polyester softener.

Still further, an advantage of the present invention is to provide an improved chewing gum product including various prolamines.

Another advantage of the present invention is to provide an improved edible product including various prolamines.

Additional features and advantages of the present invention are described in, and will be apparent from, the following Detailed Description of the Invention and the figures.

DETAILED DESCRIPTION OF THE INVENTION

Figure 1:
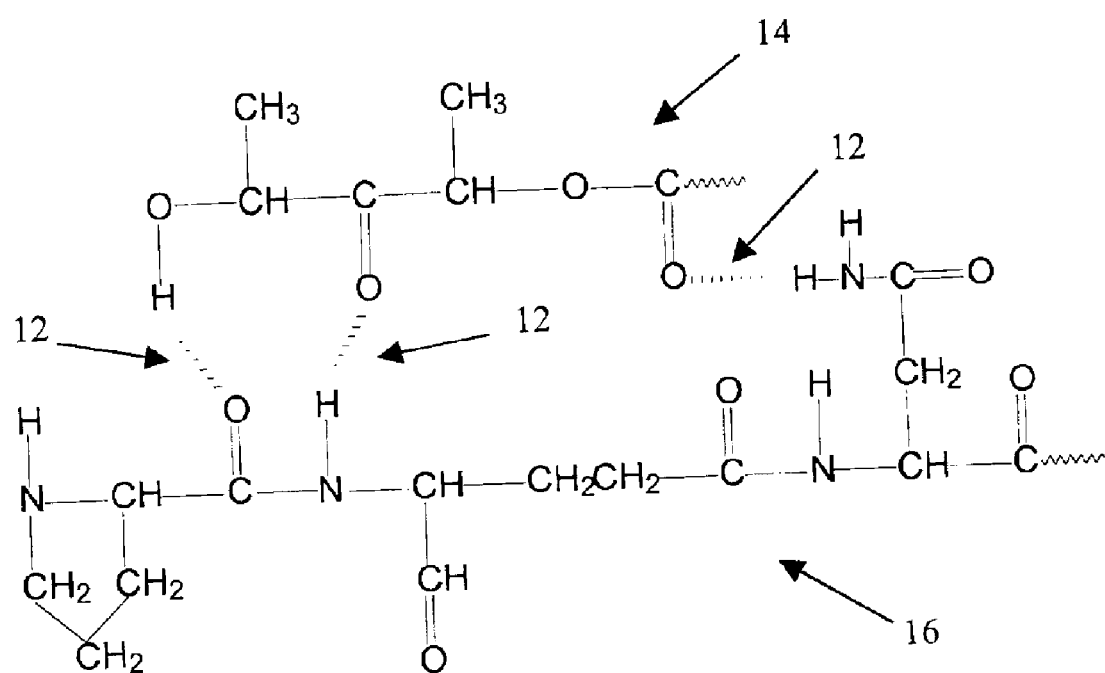
FIG. 1 represents hydrogen bonding that can occur between a polyester such as polylactic acid and a prolamine segment such as ProGluAsp.

The present invention relates to improved blends of prolamine, processes for making same, and products made therefrom. Pursuant to the present invention, blends of prolamine, such as zein, and polyester are made. By combining polyester with prolamine, prolamine becomes softer and more useable for a variety of consumer and industrial applications. Such uses include, but are not limited to, edible products, packaging films, coatings, adhesives, and encapsulations for medicaments. The broad range of potential applications of the prolamine blends is owing to their ingestibility and rapid biodegradability.

As used herein, the term "edible product" is intended to broadly refer to any product that is suitable for consumption by a mammal, and preferably a human. An edible product can include, but is not limited to, foodstuffs, confections, chewing gums, capsules for medicament delivery, and component parts thereof.

Prolamine is a food storage protein, found in the largest amounts in the seeds of plants. Prolamine is relatively rich in glutamic acid, proline, asparagine and glutamine, but it is deficient in lysine. Examples include zein (from corn) and gliadin (from wheat). Less pure versions include corn gluten meal, wheat gluten, and wheat glutenin. These prolamines are not only readily edible food ingredients, but they are also biodegradable.

Pure forms of prolamines typically are not suitable as foodstuffs or for industrial uses without first being processed. For example, pure zein and pure gliadin are very brittle plastic materials at ambient temperatures. This property is due to strong hydrogen bonding of the protein molecules. The strong intermolecular interactions also prevent them from melting prior to the occurrence of thermal decomposition. For this reason, typically zein and gliadin are used in the form of either a fine powder or an alcohol/water solution, which limits their use in consumer and industrial applications.

Whether a material is hard or rubbery at ambient temperature is characterized by its glass transition temperature (Tg). For a non-crystalline material, if its Tg is lower than ambient temperature, it should be rubbery. Both zein and gliadin have a relatively high Tg, thus they are hard and brittle at ambient temperature.

To soften a hard polymer, one can use a softer polymer to create a polymer blend. A polymer blend is relatively durable due to the entanglements of long polymer chains of the respective polymers of the blend.

The Tg of the blend falls between the Tg of each of the two parent polymers. In the present invention, the parent polymers are prolamine and polyester, respectively. More precisely, the Tg of the blend can be estimated from the Fox equation:

$$\frac{1}{T_{g,b}} = \frac{w_1}{T_{g,1}} + \frac{w_2}{T_{g,2}}$$

where $w_1$ and $w_2$ represent the weight fractions of the two parent polymers, and $T_{g,b}$ is the glass transition temperature of the blend.

Most polymers do not form miscible blends. In order to create a polymer miscible blend, the two parent polymers must have sufficient "specific interactions," such as hydrogen bonding. From their chemical structures, it is possible for prolamine and polyesters, particularly poly(hydroxy ester) such as oligomeric poly(lactic acid), to participate in hydrogen bonding. FIG. 1 represents hydrogen bonding 12 that can occur between a polyester segment such as polylactic acid 14 and a prolamine segment such as ProGluAsp 16. It is thought that this kind hydrogen bonding 12 between polylactic acid 14 and a prolamine segment such as ProGluAsp 16 facilitates the miscibility of the blend.

The inventors herein have surprisingly found that prolamines, such as zein, form miscible blends with polyesters, such as oligomeric poly(lactic acid). These blends, unlike for example, zein alone, are thermally processable, thus they can be very soft, even fluxible, before thermal decomposition occurs. As noted above, when heated, pure zein and pure gliadin will thermally decompose rather than melt. This thermal processability allowed by the present invention enables the blends to be easily incorporated into edible and biodegradable products such as chewing gum.

Poly(lactic acid) is the condensation polymer of lactic acid which is a natural food ingredient. Poly(lactic acid) is also proven to be biodegradable with lactic acid as the intermediate product, and eventually degrading to $CO_2$ and $H_2O$. Thus, the blends of prolamine and poly(lactic acid), for example, remain biodegradable and potentially edible.

Further, it has been found that the mechanical properties of the prolamine blends can be manipulated over a wide range. This range extends from a tacky state to a brittle state. The manipulation can be achieved through a change of either the polyester content or the molecular weight of the polyester, or the chemical structure of the polyester.

Pursuant to the present invention, a variety of prolamines can be used singly or in combination. Such prolamines include, but are not limited to, zein, corn gluten meal, wheat gluten, gliadin, and glutenin.

Pursuant to the present invention a variety of polyesters can be used singly or in combination. Such polyesters include, but are not limited to, poly(lactic acid), polylactide, poly(glycolic acid), polyglycolide, poly(citric acid), and polycaprolactone.

The polyesters can also include copolymers containing any combination of the following monomers: lactic acid, lactide, glycolic acid, glycolide, citric acid, adipic acid, caprolactone, ethylene oxide, ethylene glycol, propylene oxide, propylene glycol and combinations thereof. In this regard, copolymers can be random-, alternating-, blocking-, or grafting-copolymers.

The polyesters can additionally include reaction products of the reaction between rosin and at least one alcohol. Such alcohols can include, for example, methanol, ethanol, propanol, and butanol and combinations thereof.

The polyesters can additionally include reaction products of the reaction between rosin and at least one glycol. Such glycols can include, for example, glycerin, propylene glycol, ethylene glycol, poly(ethylene glycol), poly(propylene glycol), poly(ethylene glycol-co-propylene glycol) and combinations thereof.

The polyesters can additionally include reaction products of the reaction between at least one dimer acid and at least one glycol. Such glycols can include, for example, glycerin, propylene glycol, ethylene glycol, poly(ethylene glycol), poly(propylene glycol), poly(ethylene glycol-co-propylene glycol), and combinations thereof. Such dimer acids can include, for example, adipic acid and citric acid.

The polyesters can additionally include polyhydroxyalkanoate.

In the blended mixture, the prolamine can comprise about 1 to about 99.5% of the product. Preferably, prolamine comprises about 20% to about 95% of the blend. The polyester can comprise about 0.5 to about 99% of the blend. Preferably the polyester can comprise about 5% to about 80% of the blend.

The amount of polyester and/or the molecular weight of the polyester affects the mechanical properties of the blend (e.g., tack) and the miscibility. Usually miscibility decreases with an increase in molecular weight. In the present invention, low-molecular weight polyesters are preferred. When molecular weight is sufficiently high, the polyesters become solids which are then unsuitable for this invention.

Pursuant to the present invention, a process of making prolamine blends is provided. Generally, pursuant to the process, prolamine is dissolved in an alcohol/water mixture. A variety of alcohols can be used including low and high molecular weight linear or branched alcohols. For example, such suitable alcohols include, but are not limited to, methanol, ethanol, propanol, and butanol.

After dissolution of prolamine in the alcohol/water mixture, polyester is added to the solution. After mixing, the mixture is then dried to remove the solvents, whereupon a softened prolamine blend results.

Pursuant to the present invention, an alternative process of making the prolamine blends is provided. Generally, pursuant to the process, prolamine is added to a sigma-blade mixer or the like. Then polyester is added. Water is optionally added to serve as a co-plasticizer. After mixing and when homogeneous, the blend is discharged. This could also be done in a continuous mixer such as an extruder.

These processes can be achieved using techniques known in the art whereby the ingredients can be combined and mixed. Examples of suitable mixers include, but are not limited to, a sigma-blade mixer, a 2- or 3-roll mill, an extruder, etc.

Other ingredients, such as colorants, anti-oxidants, fillers, flavors etc., can also be added to the blend depending on the preferences of the practitioner of the present invention.

The end product will be a prolamine blend that preferably has a solid form, that is, powder, pellet, films, or slates. Of course the consistency and shape of the end product will vary greatly depending on the preferences of the practitioner of the present invention. If desired, the blend may be kept in solution with, for example, alcohol.

In an embodiment, the blended compositions of the present invention can be used as chewing gum bases, and as chewing gums when, for example, flavor is added. In this regard, such prolamine compositions are useful in chewing gums because of their elasticity. Moreover, because of their potential biodegradability, such compositions provide an environmentally friendly alternative to conventional chewing gums. Moreover, as the basic component of such compositions is prolamine, these gums can be potentially ingestible and digestible.

Chewing gum generally consists of a water insoluble gum base, a water soluble sweetener, and flavors. The insoluble gum base generally comprises elastomers, resins, fats and oils, softeners, and inorganic fillers. The prolamine compositions of the present invention can form ingestible elastomer substances. In order to produce an environmentally-friendly gum base, the prolamine elastomer can be further combined with other ingestible ingredients that may include polysaccharides, proteins or their hydrolysates, ingestible acids emulsifiers, and lipids. Polysaccharides may include native starches, modified starches, dextrins, maltodextrin, hydroxypropylmethylcellulose, dietary fibers, pectins, alginates, carrageenan, gellan gum, xanthan gum, gum arabic, guar gum or other natural gums. The preferred polysaccharides are maltodextrin and high-conversion dextrins. Preferably, the chewing gum bases comprise about approximately 5 to about 10% by weight polysaccharides. Among digestible proteins, hydrolyzed collagens or gelatins are preferred; the preferred content is approximately 10 to about 20% by weight in the base.

The gum base can also include fillers and optional minor amounts of ingredients such as colorants, antioxidants, etc.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Colorants and whiteners may include FD&C-type dyes and lakes, fruit and vegetable extracts, titanium dioxide, and combinations thereof.

The base may or may not include wax. An example of a wax-free gum base is disclosed in U.S. Pat. No. 5,286,500, the disclosure of which is incorporated herein by reference.

In addition to a water insoluble gum base portion, a typical chewing gum composition includes a water soluble bulk portion and one or more flavoring agents. The water soluble portion can include bulk sweeteners, high intensity sweeteners, flavoring agents, emulsifiers, colors, acidulants, fillers, antioxidants, and other components that provide desired attributes.

Bulk sweeteners include both sugar and sugarless components. Bulk sweeteners typically constitute 5 to about 95% by weight of the chewing gum, more typically, 20 to 80% by weight, and more commonly, 30 to 60% by weight of the gum.

Sugar sweeteners generally include saccharide-containing components commonly known in the chewing gum art, including, but not limited to, sucrose, dextrose, maltose, dextrin, dried invert sugar, fructose, levulose, galactose, corn syrup solids, and the like, alone or in combination.

Sorbitol can be used as a sugarless sweetener. Additionally, sugarless sweeteners can include, but are not limited to, other sugar alcohols such as mannitol, xylitol, hydrogenated starch hydrolysates, maltitol, lactitol, and the like, alone or in combination.

High intensity artificial sweeteners can also be used in combination with the above. Preferred sweeteners include, but are not limited to sucralose, aspartame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extension may be used to achieve the desired release characteristics.

Usage level of the artificial sweeteners will vary greatly and will depend on such factors as potency of the sweetener, rate of release, desired sweetness of the product, level and type of flavor used and cost considerations. Thus, the active level of artificial sweetener may vary from 0.02 to about 8%. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Example of low caloric bulking agents include: polydextrose; Raftilose, Raftilin; Fructooligosaccharides (NutraFlora); Palatinose oligosaccharide; Guar Gum Hydrolysate (Sun Fiber); or indegestible dextrin (Fibersol). However, other low calorie bulking agents can be used.

A variety of flavoring agents can be used. The flavor can be used in amounts of approximately 0.1 to about 15 weight percent of the gum and, preferably, about 0.2 to about 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

By way of further example and not limitation, examples of the present invention will now be given:

EXAMPLE 1
Poly(lactic acid) Preparation

To a 2000 ml 4-neck flask equipped with a mechanical stir, a temperature probe/controller, a nitrogen purge, an incline condenser, and heating mantle, 1,000 grams of D,L-lactic acid (Aldrich 85%) was added. Also added was 1.0 gram of butylated hydroxytoluene. The temperature was set at 100° C. initially. After 2 hours, the temperature was increased to 120° C. After another 2 hours, it was increased to 130° C., then 140° C. for 3 hours and 150° C. for another 2 hours. After cooling, the resultant mixture was a honey-thick, light grey liquid. Gel permeation chromatograph (GPC) analysis suggested an average molecular weight of 250 g/mol (lactic acid is 90). It was not water soluble.

EXAMPLE 2
Poly(lactic acid) Preparation

To a 2000 ml 4-neck flask equipped with a mechanical stir, a temperature probe/controller, a nitrogen purge, an incline condenser, and heating mantle, 1,000 grams of D,L-lactic acid (Aldrich 85%) was added. Also added were 10.0 grams of zinc lactate (Purac). The temperature was set at 100° C. initially. After 2 hours, the temperature was increased to 120° C. After another 2 hours, it was increased to 130° C., then 140° C. for 3 hours and 150° C. for another 2 hours. After cooling, the mixture was a honey-thick, almost colorless liquid. Gel permeation chromatograph (GPC) analysis suggested an average molecular weight of 210 g/mol (lactic acid is 90). It was water-soluble.

EXAMPLE 3
Preparing Zein Solution

Zein (Freeman Industries, Inc., Regular grade) was dissolved in an 87 wt % isopropanol (13% water) mixture to form a 10% solution (10 grams zein+90 grams solvents).

EXAMPLE 4
Preparing a Pure Zein Film

A film was cast from 10 grams of the mixture of Example 3 onto a flat-bottom dish with a diameter of 60 mm. It was allowed to dry for 48 hours. The film was clear yet brittle.

EXAMPLE 5
Solution Blending

The polylactic acid mixture of Example 1 was dissolved in the zein mixture of Example 3 at a ratio of 3:100 by weight. A film was cast from 10 grams of the solution onto a flat-bottom dish with a diameter of 60 mm. It was allowed to dry for 48 hours. The film was clear and soft, suggesting good miscibility. It should theoretically contain 3 parts of poly(lactic acid) for every 10 parts of zein.

EXAMPLE 6
Solution Blending

The polylactic acid mixture of Example 1 was dissolved in the zein mixture of Example 3 at a ratio of 5:100 by weight. A film was cast from 10 grams of the solution onto a flat-bottom dish with a diameter of 60 mm. It was allowed to dry for 48 hours. The film was clear and very soft, suggesting good miscibility. It should theoretically contain 5 parts of poly(lactic acid) for every 10 parts of zein.

EXAMPLE 7

Solution Blending

The polylactic acid mixture of Example 2 was dissolved in the zein mixture of Example 3 at a ratio of 3:100 by weight. A film was cast from 10 grams of such mixture onto a flat-bottom dish with a diameter of 60 mm. It was allowed to dry at ambient for 48 hours. The film was clear and soft, suggesting good miscibility. It should theoretically contain 3 parts of poly(lactic acid) for every 10 parts of zein.

EXAMPLE 8

Solution Blending

The polylactic acid mixture of Example 2 was dissolved in the zein mixture of Example 3 at a ratio of 5:100 by weight. A film was cast from 10 grams of the solution onto a flat-bottom dish with a diameter of 60 mm. It was allowed to dry for 48 hours. The film was clear and very soft, suggesting good miscibility. It should theoretically contain 5 parts of poly(lactic acid) for every 10 parts of zein.

EXAMPLE 9

Direct Blending

To a Sigma-blade laboratory mixer (Plasti-Corder Digi-System, C.W. Brabender Instruments, Inc., South Hackensack, N.J.), 36 grams of zein were added, and then 20 grams of poly(lactic acid) (Example 1) were added during agitation. The mixer was set at 80° C. and 32 rpm. After mixing for 60 minutes, the blend was discharged. It was soft, elastic, and translucent, indicating good miscibility.

EXAMPLE 10

Preparing a Chewing Gum

To a Brabender mixer set at 60° C. and 30 rpm, 50 grams of gum base prepared in Example 9 were added and agitated for 10 minutes. Then 6 grams of mannitol and 0.5 grams of acesulfame K were added. After 10 more minutes of further mixing, 0.5 ml fruit flavor was added and mixed for another 10 minutes. Then the gum was discharged, rolled to a sheet, and cut into gum cubes. It was soft, pliable, and had a lasting chewing texture similar to a conventional chewing gum. Samples of chewed gum cuds were placed on an outdoor surface and remained undisturbed for two weeks. Thereafter the gum cuds showed obvious signs of degradation such as drying, cracking and disintegration.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An chewing gum comprising:
    a miscible blend facilitated by hydrogen bonding comprising at least one prolamine and at least one polyester
    wherein the polyester includes monomers selected from the group consisting of lactic acid, lactide, glycolic acid, glycolide, citric acid, adipic acid, caprolactone, ethylene oxide, ethylene glycol, propylene oxide, and propylene glycol, and combinations thereof.

2. The product of claim 1, wherein the prolamine is selected from the group consisting of zein, corn gluten meal, wheat gluten, gliadin, glutenin and combinations thereof.

3. The product of claim 1, wherein the polyester is selected from the group consisting of poly(lactic acid), polylactide, poly(glycolic acid), polyglycolide, poly(citric acid), polycaprolactone and combinations thereof.

4. The product of claim 1, wherein the polyester is a copolymer containing at least two monomers selected from the group consisting of lactic acid, lactide, glycolic acid, glycolide, citric acid, adipic acid, caprolactone, ethylene oxide, ethylene glycol, propylene oxide, propylene glycol and combinations thereof.

5. The product of claim 4, wherein the copolymer is of the type selected from the group consisting of random-, alternating-, blocking-, grafting- or combinations thereof.

6. The product of claim 1, wherein the polyester is a reaction product of a reaction between rosin and at least one alcohol.

7. The product of claim 6, wherein the alcohol is selected from the group consisting of methanol, ethanol, propanol, butanol and combinations thereof.

8. The product of claim 1, wherein the polyester is a reaction product of a reaction between rosin and at least one glycol.

9. The product of claim 8, wherein the glycol is selected from the group consisting of glycerin, propylene glycol, ethylene glycol, poly(ethylene glycol), poly(propylene glycol), poly(ethylene glycol-co-propylene glycol) and combinations thereof.

10. The product of claim 1, wherein the polyester is a reaction product of a reaction between at least one dimer acid with at least one glycol.

11. The product of claim 10, wherein the glycol is selected from the group consisting of glycerin, propylene glycol, ethylene glycol, poly(ethylene glycol), poly(propylene glycol), poly(ethylene glycol-co-propylene glycol) and combinations thereof.

12. The product of claim 10, wherein the dimer acid is selected from the group consisting of adipic acid and citric acid.

13. An chewing gum product comprising:
    a miscible blend facilitated by hydrogen bonding comprising at least one prolamine and at least one polyester wherein the polyester includes reaction products selected from the group of reactions consisting of a reaction between rosin and at least one alcohol, a reaction between rosin and at least one glycol, and a reaction between at least one dimer acid and at least one glycol.

14. The product of claim 13, wherein the prolamine is selected from the group consisting of zein, corn gluten meal, wheat gluten, gliadin, glutenin and combinations thereof.

15. The product of claim 13, wherein the alcohol is selected from the group consisting of methanol, ethanol, propanol, butanol and combinations thereof.

16. The product of claim 13, wherein the glycol is selected from the group consisting of glycerin, propylene glycol, ethylene glycol, poly(ethylene glycol), poly(propylene glycol), poly(ethylene glycol-co-propylene glycol) and combinations thereof.

17. The product of claim 13, wherein the dimer acid is selected from the group consisting of adipic acid and citric acid.

* * * * *